United States Patent
Yaguchi

(10) Patent No.: US 8,527,202 B2
(45) Date of Patent: Sep. 3, 2013

(54) MAP DISPLAY APPARATUS AND PROGRAM FOR THE SAME

(75) Inventor: Ken Yaguchi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 73 days.

(21) Appl. No.: 13/036,238

(22) Filed: Feb. 28, 2011

(65) Prior Publication Data

US 2011/0238295 A1    Sep. 29, 2011

(30) Foreign Application Priority Data

Mar. 26, 2010 (JP) .................................. 2010-71883

(51) Int. Cl.
*G01C 21/00* (2006.01)

(52) U.S. Cl.
USPC ............................ 701/527; 701/432; 340/438

(58) Field of Classification Search
USPC ................. 701/201, 527, 210, 208, 212, 432, 701/428; 340/438, 995.1
See application file for complete search history.

(56) References Cited

U.S. PATENT DOCUMENTS

| | | | |
|---|---|---|---|
| 5,720,705 A | 2/1998 | Inge et al. | |
| 6,710,774 B1 | 3/2004 | Kawasaki et al. | |
| 7,869,947 B2 * | 1/2011 | Schirmer et al. ............... | 701/411 |
| 2006/0187238 A1 | 8/2006 | Yoneji | |
| 2006/0271284 A1 | 11/2006 | Watanabe et al. | |
| 2007/0198181 A1 * | 8/2007 | Shimamura .................... | 701/211 |
| 2009/0198443 A1 * | 8/2009 | Yamazaki ...................... | 701/210 |
| 2010/0023255 A1 * | 1/2010 | Nambata ........................ | 701/201 |
| 2010/0114477 A1 * | 5/2010 | Yeh ................................ | 701/201 |
| 2010/0321176 A1 * | 12/2010 | Hofmann et al. .............. | 340/438 |
| 2010/0332119 A1 * | 12/2010 | Geelen et al. .................. | 701/201 |
| 2011/0025531 A1 * | 2/2011 | Geelen et al. ............... | 340/995.1 |
| 2011/0106430 A1 * | 5/2011 | Schirmer et al. .............. | 701/201 |
| 2011/0109618 A1 * | 5/2011 | Nowak et al. .................. | 345/419 |

FOREIGN PATENT DOCUMENTS

| | | |
|---|---|---|
| JP | A-05-019691 | 1/1993 |
| JP | H10-254669 A | 9/1998 |
| JP | A-2001-264100 | 9/2001 |
| JP | A-2003-114130 | 4/2003 |
| JP | A-2005-147792 | 6/2005 |
| JP | 2005-337719 A | 12/2005 |
| JP | 2008-058021 A | 3/2008 |

OTHER PUBLICATIONS

JP Office Action mailed Jun. 25, 2013 in the corresponding JP application No. 2010-071883; English translation.

* cited by examiner

*Primary Examiner* — Thomas Black
*Assistant Examiner* — Shardul Patel
(74) *Attorney, Agent, or Firm* — Posz Law Group, PLC

(57) ABSTRACT

A map display apparatus is disclosed. The apparatus acquires present position information indicating a present position, and determines a route from the present position to a destination. The apparatus displays a map on a display screen based on map information acquired from a storage medium storing the map information, and displays the route in a form of a line on the map while switching a manner of displaying the route between multiple display modes including a first display mode and a second display mode. In the first display mode, the route is displayed to have a first transparency and a first width. In the second display mode, the route is displayed to have a second transparency more transparent than the first transparency and a second width larger than the first width.

8 Claims, 5 Drawing Sheets

MAP DISPLAY APPARATUS AND PROGRAM FOR THE SAME

CROSS REFERENCE TO RELATED APPLICATION

The present application is based on and claims priority to Japanese Patent Application No. 2010-71883 filed on Mar. 26, 2010, disclosure of which is incorporated herein by reference.

BACKGROUND OF THE INVENTION

1. Field of the Invention

The present invention relates to a map display apparatus that determines a route from a present position to a destination and displays the determined route in the form of a line on a map.

2. Description of Related Art

A typical map display apparatus for a car navigation system displays a route line on a map in order to indicate a route (navigation route) to a destination and guide a user to the destination. It is preferable that a user can quickly recognize a navigation route from the displayed route line even if the user is driving the vehicle.

In general, the route line is displayed as a wide line on a map with the color of the route line being different from that of a road line. Further, an arrow mark is displayed over the route line so that a user can easily recognize a direction to the destination (see JP-H5-19691A for example).

In this relation, the inventor of the present application has found out the followings.

In some case, when a route line is superimposed on a map, it becomes difficult to recognize information shown on the map due to the route line. For example, when roads on a map are displayed in different colors according to road type and when the color of a certain road is covered by the route line, the type of the certain road becomes unperceivable. In addition, in some cases, the route line may partially cover a symbol, a text, or an intersection shape etc. on the map.

If the route line is displayed as, for example, a thin line or a broken line to reduce an area covered by the route line, it becomes easier to recognize information on a map; however, visibility of a route line is reduced because it becomes difficult to find out a route line upon viewing a display screen or the navigation route is displayed in an indefinite manner.

SUMMARY OF THE INVENTION

The present invention is made in view of the foregoing. It is an objective of the present invention to provide a map display apparatus that enables a user to easily recognize displayed information. It is also an objective of the present invention to provide a computer readable storage medium storing therein a computer program that causes a computer to function as at least a part of a map display apparatus.

According to a first aspect of the present invention, a map display apparatus includes: a position information acquisition section configured to acquire present position information indicating a present position; a route determination section configured to determine a route from the present position, which is indicated in the present position information acquired by the position information acquisition section, to a destination designated via an input from an external of the map display apparatus; and a display section configured to display a map on a display screen based on map information acquired from a storage medium storing the map information, and configured to display the route, which is determined by the route determination section, in a form of a line on the map. The display section is further configured to display the route on the map while switching a manner of displaying the route between multiple display modes including a first display mode and a second display mode. In the first display mode, the route is displayed to have a first characteristic. In the second display mode, the route is displayed to have a second characteristic. The first characteristic includes at least one of a first transparency and a first width. The second characteristic includes at least one of a second transparency more transparent than the first transparency and a second width larger than the first width.

According to a second aspect of the present invention, a computer readable storage medium storing a program is provided. The program causes a computer to perform the steps of: displaying a map on a display screen based on map information acquired from a storage medium storing the map information; displaying a route from a present position to a destination in a form of a line on the map; switching a manner of displaying the route in turn between a plurality of display modes including a first display mode and a second display mode. In the first display mode, the route is displayed to have a first characteristic. In the second display mode, the route is displayed to have a second characteristic. The first characteristic includes at least one of a first transparency and a first width. The second characteristic includes at least one of a second transparency more transparent than the first transparency and a second width larger than the first width.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Embodiments of the present invention will be described with reference to the accompanying drawings. It should be noted that the below-described embodiments are merely examples. Embodiments of the present invention can have various forms and are not limited to the below-described embodiments.

[First Embodiment]

(1) Configuration Outline

Figure 1:
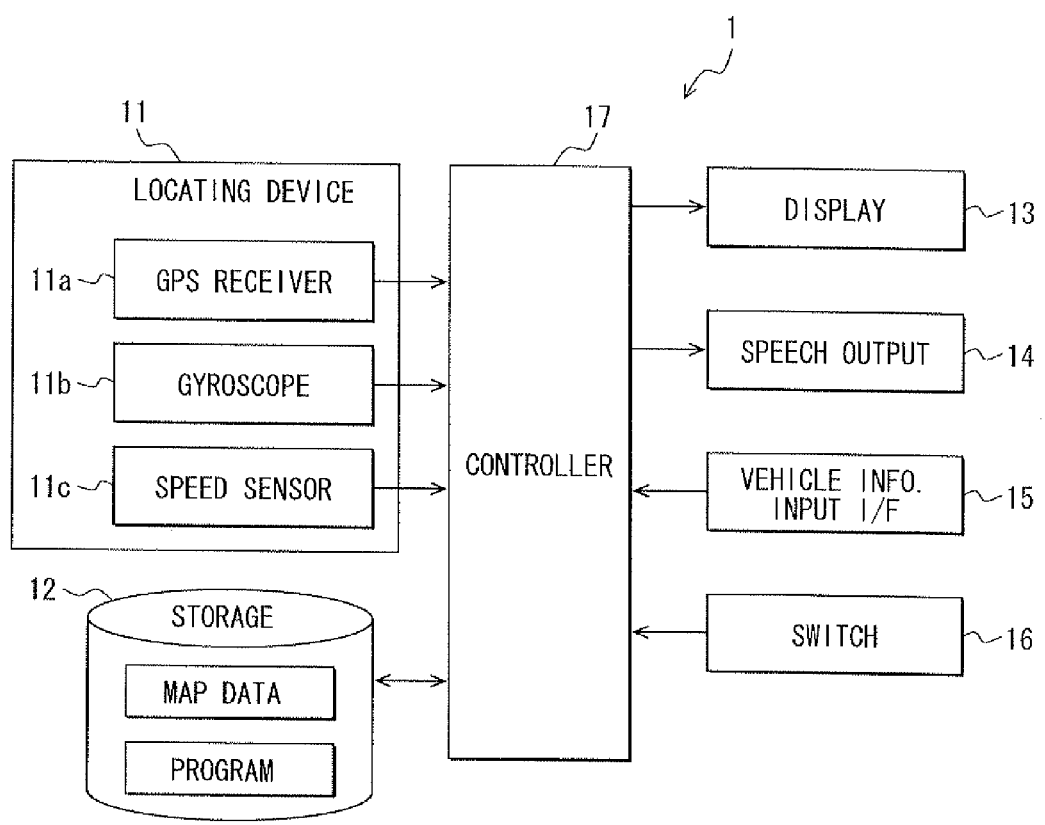
FIG. 1 is a block diagram illustrating a map display apparatus.

A map display apparatus 1 of the present embodiment has a function of a navigation system which is mounted to a vehicle and for use in the vehicle. As shown in FIG. 1, the map display apparatus 1 includes a locating device 11 for detecting the present position of the vehicle, a storage device 12 for storing data, a display device 13 for presenting various image displays such as a map display and the like, a speech output device 14 for outputting speech information such as guidance speech and the like, a vehicle information input I/F 15 for receiving and inputting output signals of various sensors in the vehicle, an group of operation switches 16 for enabling a user to input various instructions, and a controller 17.

The locating device 11 is capable of acquiring present position information indicating the present position of the vehicle. The locating device 11 includes a GPS (global positioning system) receiver 11a, a gyroscope 11b, and a vehicle speed sensor 11c. The GPS receiver 11a receives GPS information from GPS satellites via a GPS antenna and detects position coordinate of the vehicle. The gyroscope 11b outputs a detection signal in accordance with angular velocity of rotation movement of the vehicle. The vehicle speed sensor 11c outputs a detection signal in accordance with speed of the vehicle. Since respective sensors 11a to 11c have errors that are different in property form each other, the sensors 11a to 11c are used while the errors are being complemented each other.

The storage device 12 includes a computer readable storage medium having various memory areas for storing date. For example, the memory areas include a memory area for storing a software program for operating the map display apparatus 1, a memory area for storing map data indicating map information, a memory area for storing a variety of data other than the foregoing data, and the like. The map data stored in the storage device 12 includes road data, drawing data and the like. The road data can be used in map matching, route calculation associated with the below-described route calculation process, route guidance associated with the below-described route guidance process, and the like. The drawing data includes various data used in map display.

The display device 13 has a display screen and may be a color display device such as a liquid crystal display and the like. The display device 13 displays various images on the display screen in accordance with an input of an image signal from the controller 17. For example, when a vehicle is traveling, the display device 13 presents a map display by displaying a map based on the map data read from the storage device 12, and by superimposing various information elements on the map. The various information elements include, for example, a vehicle symbol indicating the present position of the vehicle detected by the locating device 11, names, marks, various landmark symbols, a route line indicating a route to a destination, and the like.

The speech output device 14 is configured to notify a user of a variety of information in the form of speech. The map display apparatus 1 can guide a user by using both of display of the display device 13 and speech output of the speech output device 14.

The vehicle information input I/F 15 can act as an interface for receiving output signals from various sensors, e.g., a sensor for detecting user's brake operation, a sensor for detecting user's gas pedal operation, a sensor for detecting user's blinker operation etc. The vehicle information input I/F 15 transfers the received output signal to the controller 17.

The group of operation switches 16 includes a touch sensitive panel integrated with the display device 13, mechanical key switches provided in a periphery of the display device 13, or the like.

The controller 17 includes a microcomputer with a central processing unit (CPU), a read-only memory (ROM), a random access memory (RAM), an input/output port (I/O port), a bus line connecting the forgoing components, and the like. The controller 17 controls generally all of operations of the map display apparatus 1. Based on software programs or various data read from the ROM, the RAM, the storage device 12 or the like, the controller 17 performs a navigation-related process, a process associated with a dynamical change in manner of displaying a route line, a display speed determination process, and the like.

The navigation-related process includes a map display process, a route calculation process, a route guidance process etc. In the map display process, the controller 17 acquires present position information indicating present position of the vehicle, calculates the present position of the vehicle based on the present position information, which may be provided from detection signals from the locating device 11, and causes the display device 13 to display a map around the present position of the vehicle based on the map data stored in the storage device 12. In the route calculation process, the controller 17 calculates an optimum route from the present position to a destination based on the map data stored in the storage device 12. The destination may be designated via user operation on the group of operation switches 16. A method for automatically calculating an optimum route may include a cost calculation based on Dijkstra's algorithm.

In the route guidance process, the controller 17 provides drive guidance to a destination in such manner that a route line indicating a route calculated at the route calculation process is superimposed on a map display, or, information about the route is outputted as speech from the speech output device 14. In the route guidance process, the controller 17 calculates and determines a guidance point (i.e., a point at which the guidance is to performed) and content of the guidance at the guidance point (right or left turn instructions etc.), based on a route calculation result and data stored in the map data such as road shape data, intersection positional information, railroad crossing positional information and the like.

Figure 2A:
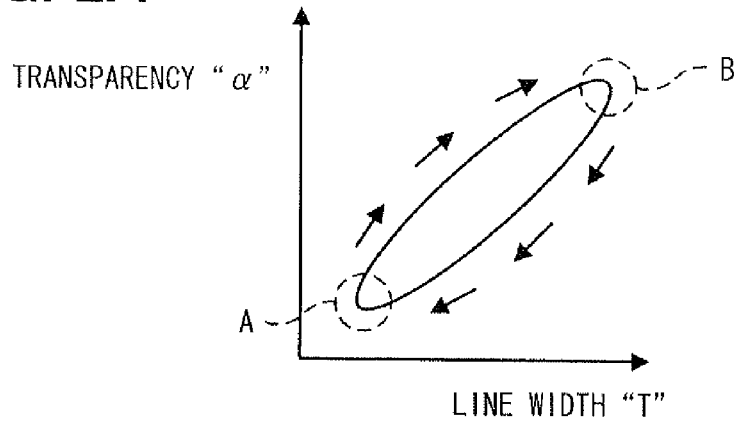
FIGS. 2A, 2B and 2C are graphs each illustrating a correlation between transparency and width of a route line.

(2) Map Display Apparatus Operation (2-1) dynamical change in route line display manner In the route guidance process, the map display apparatus 1 of the present embodiment dynamically changes a manner of displaying a route line on a map display. Parameters of the change in manner of displaying a route line include transparency and width of the route line. Values of the parameters are changed with time while demonstrating a predetermined correlation between the transparency "α" and the width "T", as shown in FIG. 2A for example. In other words, the map display apparatus 1 displays a route line while switching a manner of displaying the route line between multiple display modes. Speed of the change (i.e., speed of switching between multiple display modes) may be determined in the below-described display speed determination process. Herein, a manner of displaying a route line is also referred to as a display manner of a route line.

In FIG. 2A, the correlation between the transparency "α" and the width "T" is depicted as an ellipse so that a control point, which is determined by the values of the transparency "α" and the width "T", is moved on the ellipse. In the graph of FIG. 2, when the control point is within a region "A", the display manner of the route line is such that the transparency of the route line is low (i.e., relatively nontransparent) and the width of the route line is small (i.e., thin). By contrast, when the control point is within a region "B", the display manner of the route line is such that the transparency of the route line is high (i.e., relatively highly-transparent) and the width of the route Line is large (i.e., thick). As can be seen from FIG. 2A, the display manner of the route line is changed so as to be switched in turn between the region "A" and the region "B". In the course of switch between the region "A" and the region "B", the display manner of the route line is intermediate between that in the region "A" and that in the region "B", so that the values of the parameters are intermediate between those in the region "A" and those in the region "B".

Figure 3:
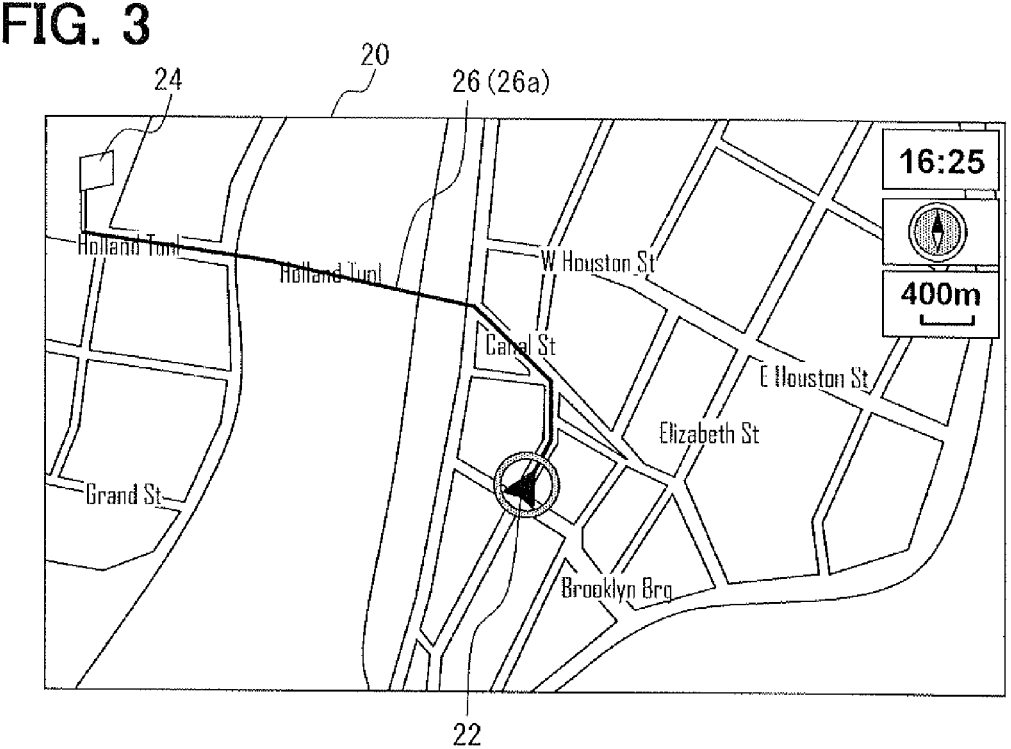
FIG. 3 is a diagram illustrating a map display.
Figure 4:
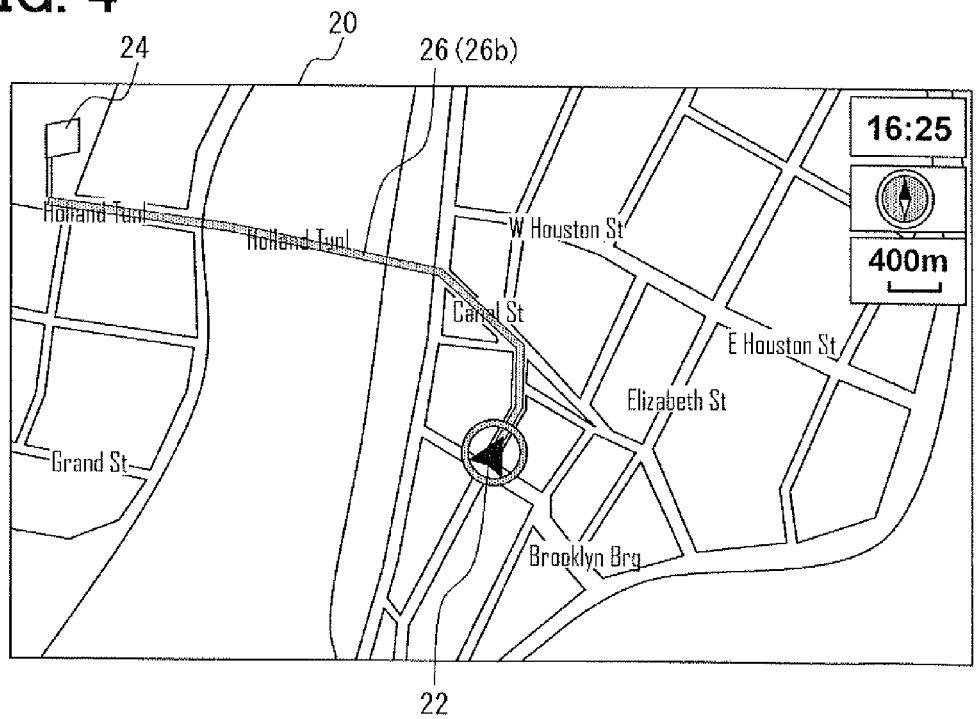
FIG. 4 is a diagram illustrating a map display in which a route line is displayed in a display mode other than that in FIG. 3.
Figure 5:
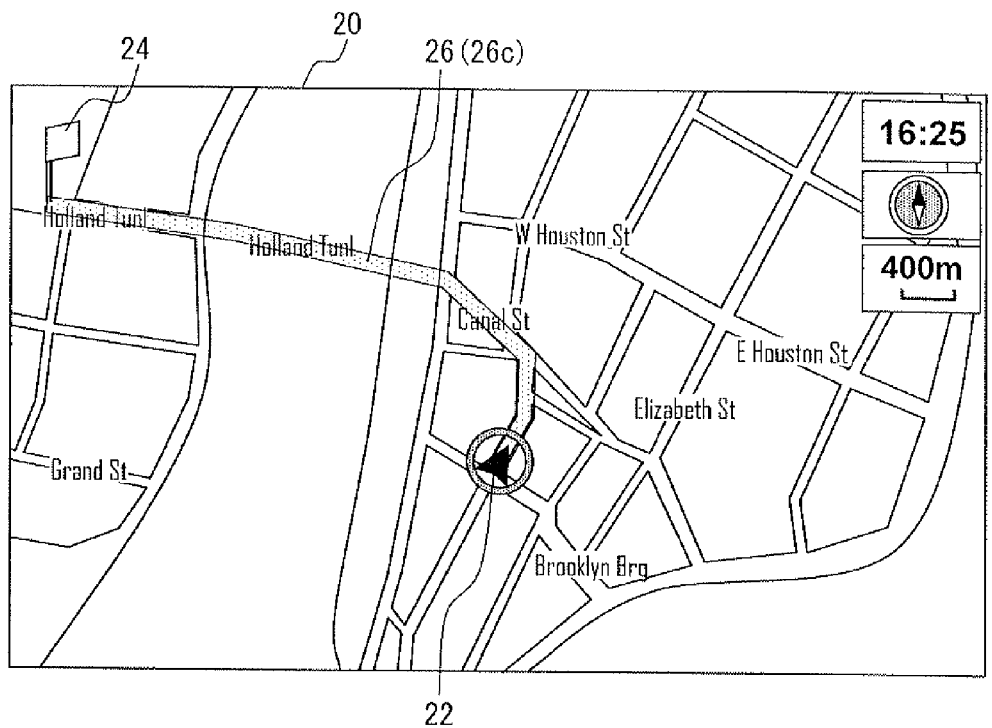
FIG. 5 is a diagram illustrating a map display in which a route line is displayed in a display mode other than that in FIG. 3 and FIG. 4.

A specific example of the above change in display manner will be described below with reference to FIGS. 3 to 5 each illustrating a map display 20. In the map display 20, various information elements are superimposed on a map. The various information elements include a vehicle symbol 22 indicating a present location and a heading direction of the vehicle, a destination symbol 24 indicating a destination designated via an user input to the group of operation switches 16, and a route line 26 (26a, 26b, 26c) indicating a route from the present location to the destination calculated at the route calculation process. FIGS. 3 to 5 are different from each other only in display manner (display mode).

FIG. 3 illustrates the map display 20 that is displayed in a first display mode corresponding to the region "A". As shown in FIG. 3, in the first display mode, a route line 26a is displayed to have a low transparency and a small width.

FIG. 4 illustrates the map display 20 that is displayed in an intermediate display mode. In the intermediate display mode, a route line 26b is displayed to have a higher transparency and a larger width as compared with the route line 26a.

FIG. 5 illustrates the map display 20 that is displayed in a second display mode corresponding to the region "B". In the second display mode, a route line 26c is displayed to have a higher transparency and a larger width as compared with the route line 26b.

It should be noted that FIGS. 3 to 5 illustrate example shots of the map display 20 during the change in display manner. The map display apparatus 1 may display the map display 20 while switching the display manner between a number of display modes at short time intervals, so that it appears to a user that the display manner of the route line is smoothly changing. In the above, a number of display modes may be in accordance with the correlation illustrated in FIG. 2A.

Since the correlation depicts the ellipse in a case of FIG. 2A, a path of the control point from the region B" to the region "A" is different from a path of the control point from the region "A" to the region "B", and thus, the intermediate display mode along the path to the region "A" is different in values of the parameters from that along the path to region "B". By changing the display manner in this way, it is possible to smoothly change the display manner in particular in the vicinity of the region "A" and the region "B" and it is possible to reduce an amount of effort that a user expends to visual recognize the route line.

Figure 2B:
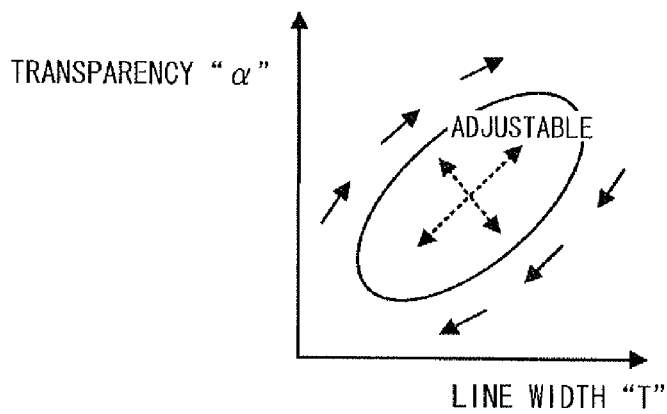
Figure 2C:
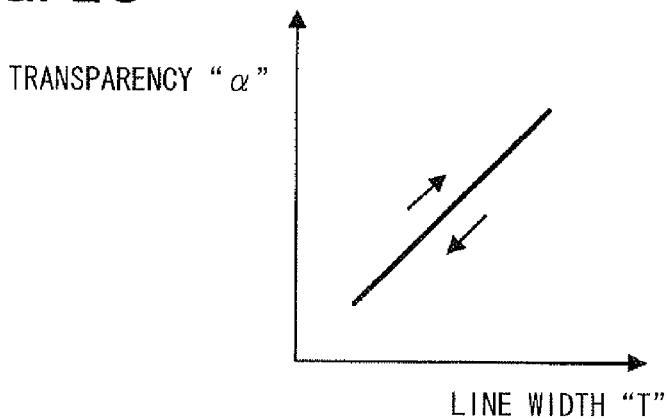

The correlation between the parameters may be variable and adjustable according to, for example, user preference, user age, user sex and the like. For example, as shown in FIG. 2B, the correlation between the parameters can be adjusted so that movement of the control point or peak of the route line is changed, wherein the peak of the route may be the transparency and the width of the route line at the region "A" and the region "B". Alternatively, as shown in FIG. 2C, the display manner may be changed so that the control point moves on a straight line.

Merits of the above change in display manner of the route line 26 will be described.

Since the route line 26a illustrated in FIG. 3 is small in width, an area covered by the route line 26a is small on the map display 20. An advantages associated with this is as follows.

Suppose that roads on a map are displayed in different display colors according to road type. In this case, if a route line with a large width is displayed on a road, the display color of the road becomes invisible and the type of the road becomes unperceivable. However, when the road line is displayed to have a small width, the display color of the road becomes visible and the type of the road becomes perceivable.

In addition, even if the route to the destination passes through a complicated intersection or a narrow road, a small width of the route line allows a user to easily see which of roads is instructed by the route line. In this relation, since a low transparency of the route line maintains and ensures visibility even when route line has a small width, it is unlikely that the width of the route line is too small for a user to catch which of roads is instructed.

In addition, the route line has a less efficiency in covering map information such as a symbol, a place name and the like on the map, visibility is enhanced.

The route line 26c illustrated in FIG. 5 has a relatively high transparency and a relatively large width. Because of the high transparency, the map information such as a nimble and a place-name displayed underneath the route line becomes easily visible through the route line. Moreover, because of the large width of the route line, it becomes to easily find out the route line from the map display 20, and it becomes to easily recognize the route.

As can be seen from the above, according to the map display apparatus 1 of the present embodiment, since a user can see the route line in different display modes such as the route line 26a and the route line 26c from the map display 20, the user can clearly see the route and the map information (e.g., the type of road, symbols, place-names and the like) displayed on the map display 20.

In addition, when switching display between the route line 26a and the route line 26c, the map display apparatus 1 displays the route line in the intermediate display mode, e.g., the route line 26b and the like. Therefore, the change in display manner is smooth. Accordingly, it is possible to reduce an amount of effort that a user expends to see the route line.

In addition, since the display manner of the route line 26 is continuously changed with time, a user may just look for a moving line to see the route line. Therefore, it becomes easy to find out the route line on the map display 20.

(2.2) Display Speed Determination Process

Figure 6:
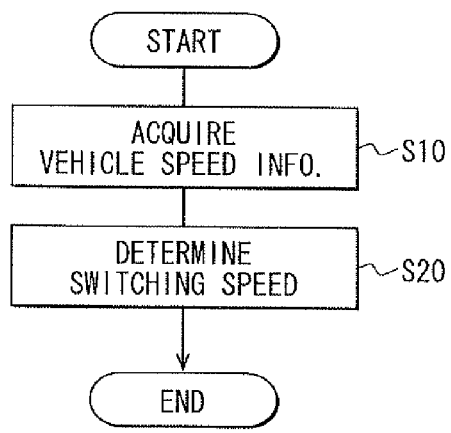
FIG. 6 is a flowchart illustrating a procedure of a display speed determination process.

The display speed determination process, which is performed by the controller 17 of the map display apparatus 1, will be described below with reference to FIG. 6. The display speed determination process is performed at predetermined time intervals (e.g., 1 second) parallel to the route guidance process. Since the route calculation process and the route guidance process may be performed in a known way, detailed explanation is omitted.

Figure 7:
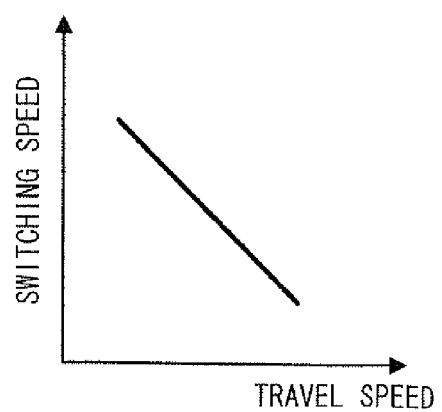
FIG. 7 is a diagram illustrating a correlation between travel speed and switching speed.

At S10 of the display speed determination process, the controller 17 acquires vehicle speed information indicating speed of the vehicle. For example, the controller 17 receives a signal that is outputted from a vehicle speed sensor 11c and that depends on travel speed of the vehicle. At S20, the controller 17 determines speed of switching the display manner, which speed is also referred as switching speed. The switching speed is associated with how often display is switched between the route lines 26a, 26b, 26c etc. during a predetermined time period. The switching speed corresponds to speed of movement of the control point on the graph illustrated in, for example, FIG. 2A. The controller 17 determines at S20 the switching speed from the vehicle speed information by using a map (called also a function) indicating a correlation between the travel speed and the switching speed. An example of the map is shown in FIG. 7. After S20, the display speed determination process is ended.

In the map employed in the present embodiment, the switching speed is smaller as the travel speed is larger, as shown in FIG. 7. Accordingly, when the vehicle is traveling at high speeds, the switching speed is smaller. In this way, it is possible to reduce an amount of user effort in visual recognition, and it is possible to accomplish and ensure both of visibility and safety.

As described in the above, the map display apparatus of the present embodiment displays the route line in multiple different display modes. Although information that is easily perceivable by a user varies according to display mode, a user can see the display screen to recognize the information in each of multiple display modes because of switching between multiple display modes. Therefore, the map display apparatus 1 of the present embodiment enables a user to easily recognize a lot of information shown on the map display.

In addition, since the display manner is smoothly switched and since the switching speed varies depending on the travel speed of the vehicle, it is possible to reduce an effort that a user expends to see the route line.

(Modifications)

The above embodiments can be modified in various ways, examples of which will be described.

In the above embodiment, the display manner of a route line is switched between the first display mode, the second display mode and the intermediate display mode. For example, display of a route line is gradually switched between the route line 26a having a low transparency and a small width, the route line 26c having a high transparency and a large width, and each of multiple route lines (e.g., the route line 26b) having an intermediate transparency and an intermediate width. Alternatively, the display manner of a route line may be sequentially switched between only two display modes. For example, display of a route line is switched between only the route line 26a and the route line 26c. In this configuration, although smoothness of the change in display manner is decreased, it is possible to decrease an amount of processing load.

In the above embodiment, the parameters of the change in display manner of a route line have transparency and width. Alternatively, only one of transparency and width may be used as the parameter of the change in display manner of a route line.

For example, when only the transparency is used as the parameter, the display modes may include a first display mode where the route line has a low transparency and a second display mode where the route line has a high transparency more transparent compared with the first display mode, and an intermediate display mode where the transparency of the route line is intermediate between the first display mode and the second display mode. In this configuration, in the first display mode, a user can easily see the route line from the map display and recognize the route. In the second display mode, a user can see, through the route line, the map information displayed underneath the route line, e.g., symbols and text information such as place name and the like. Since the map display apparatus 1 can display the route line on the map in at least two display modes for different values of the transparency, the map display apparatus 1 enables a user to easily catch a lot of information displayed on the map display.

When only the width is used as the parameter, the display modes may include a first display mode where the route line has a small width, a second display mode where the route line has a larger width compared with the first display mode, and an intermediate display mode where the width of the route line is intermediate between the first display mode and the second display mode. In this configuration, in the first display mode, since an area of the map covered by the route line becomes small on the map display, the reduction of visibility of the map information due to the route line can be suppressed. In the second display mode, since the width of the route line is large, a user can easily find out the route line on the map display and easily recognize the route. Since the map display apparatus 1 can display the route line on the map in at least two display modes for different values of the width, a user can easily catch a lot of information displayed on the map display.

In the above embodiment, the switching speed of the display manner of a route line is smaller as the travel speed of the vehicle is larger. Alternatively, the switching speed may be larger as the travel speed of the vehicle is larger. For example, the switching speed may be made faster if the travel speed of the vehicle exceeds a speed limit. In this configuration, it is possible to notify a user of overspeed.

In the above embodiment, the display speed determination process changes the switching speed depending on the travel speed of the vehicle. Alternatively, the switching speed may be changed depending on another factor or condition. For example, the switching speed may be changed depending on a distance to a guidance point along a route such as a branch point, an entrance point of an expressway and the like. In this configuration, the display speed determination process may be performed in accordance with a procedure illustrated in FIG. 8.

Figure 8:
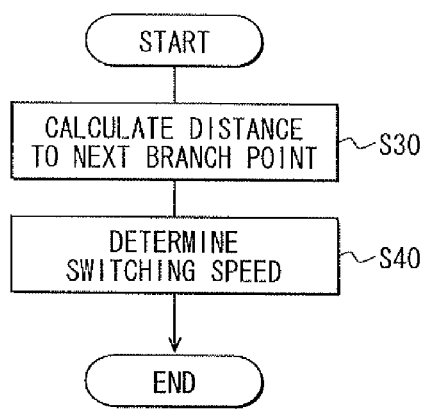
FIG. 8 is a flowchart illustrating a procedure of a display speed determination processes according to a modification example.
Figure 9:
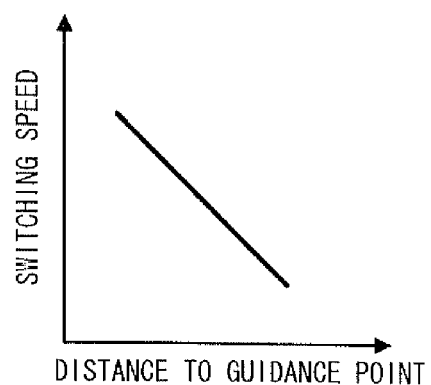
FIG. 9 is a diagram illustrating a correlation between switching speed and distance to a guidance point.

At S30 of the display speed determination process in FIG. 8, the controller 17 calculates a distance from the present position to the guidance point such as a next branch point and the like along the route determined at the route determination process. At S40, the controller 17 determines the switching speed of the display manner based on the distance calculated at S30. For example, the switching speed is determined by using a map illustrating a correlation between the distance and the switching speed. The correlation is, for example, one illustrated in FIG. 9.

According to the above configuration of the map display apparatus, when a user approaches the guidance point (e.g., a branch point), the map display apparatus changes the switching speed, thereby reducing an amount of user effort in visual recognition or providing information indicating that the user approaches the guidance point.

Alternatively, the switching speed may be changed based on the present position on the map. More specifically, for example, the switching speed may be changed (e.g., made slower) in the vicinity of an expressway or a busy intersection, so that it is possible to accomplish and ensure both of visibility and safety without requiring a user to expend a lot of efforts to see the display.

Figure 10:
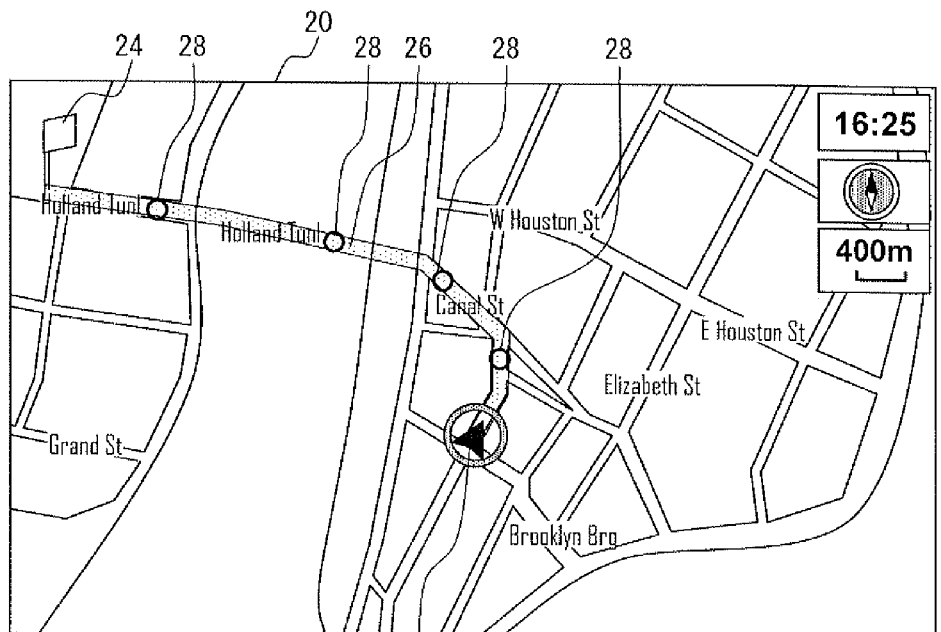
FIG. 10 is a diagram illustrating a map display according to a modification example.

A mark moving along the route may be displayed in order to indicate a direction according to the route. For example, as shown by the map display 20 in FIG. 10, a circular mark 30 may be displayed on the route line 26 so that the circular mark 30 moves along the route line 26 from the vehicle symbol 22 to a destination symbol 24.

In time with the change in display manner of the route line 26, a display manner of the mark 30 may be changed or may not be changed. For example, the transparency or the size of the mark 30 may be changed in time with the change in display manner of the route line 26. Depending on whether the vehicle stays on or stays off the route, the display manner may be changed. For example, when the vehicle stays off the route, the route line may be displayed so that the change in display manner is conspicuous. When the vehicle stays on the route while traveling in a direction according to the route, the route line may be displayed so that the change in display manner is inconspicuous.

Further, in order to indicate a direction according to the route, the route line may be displayed such that a portion of the route line that the vehicle has already passed through may be different in display manner from the other portion of the route line that the vehicle has not passed through yet. For example, the portion of the route that the vehicle has already passed through is more transparent than the other portion of the route that the vehicle has not passed through yet.

In the above-described embodiments and modifications, the locating device 11 or the controller 17 may act as a position information acquisition section or means for acquiring present position information indicating present position. The controller 17 may act as a route determination section or means for determining a route from the present position to a destination. The controller 17 or the display device 13 may act as a display section or means for displaying a map on a display screen, and for displaying a route in a form of a line on the map while switching a manner of displaying the route between multiple display modes.

The present disclosure provides the following example configurations.

According to a first example, a map display apparatus includes: a position information acquisition section configured to acquire present position information indicating a present position; a route determination section configured to determine a route from the present position, which is indicated in the present position information acquired by the position information acquisition section, to a destination designated via an input from an external of the map display apparatus; and a display section configured to display a map on a display screen based on map information acquired from a storage medium storing the map information, and configured to display the route, which is determined by the route determination section, in a form of a line on the map. The display section is further configured to display the route on the map while switching a manner of displaying the route between multiple display modes including a first display mode and a second display mode, such that: in the first display mode, the route is displayed to have a first transparency and a first width; and in the second display mode, the route is displayed to have a second transparency more transparent than the first transparency and a second width larger than the first width.

According to the above map display apparatus, the line indicating the route, which is called a route line, can be displayed in the first display mode and the second display mode.

In the first display mode, since the route line has a relatively low transparency but has a relatively small width, an area of the map covered by the route line becomes small on the display screen. As a result, the reduction of visibility of information on the map by the route line can be suppressed. In addition, since the route line has a small width, even if the route passes through a complicated intersection or a narrow road, a user can clearly recognize which of roads is instructed by the route line.

In the second display mode, the route line has a relative high transparency and a relatively large width. Because of the high transparency, the information displayed underneath the route line on the map can be visually perceivable through the route line. The information displayed underneath the route line on the map may be, for example, text information such as place names and the like. In addition, since the route line has a larger width, a user can easily find out the route line on the map displayed on the display screen, thereby recognizing the route with ease.

Moreover, the map display apparatus displays the route line on the map while switching between the multiple displays modes including the first display mode and the second display mode. Although information easily perceivable by the user varies in the multiple display modes, the switching between the multiple display modes enables a user to visually recognize the information displayed in each of the multiple display modes. Therefore, the above map display apparatus enables a user to easily recognize a lot of information displayed on the display screen.

According to a second example, a map display apparatus includes: a position information acquisition section configured to acquire present position information indicating a present position; a route determination section configured to determine a route from the present position, which is indicated in the present position information acquired by the position information acquisition section, to a destination designated via an input from an external of the map display apparatus; and a display section configured to display a map on a display screen based on map information acquired from a storage medium storing the map information, and configured to display the route, which is determined by the route determination section, in a form of a line on the map. The display section is further configured to display the route on the map while switching a manner of displaying the route in turn between multiple display modes including a first display mode and a second display mode, such that: in the first display mode, the route is displayed to have a first transparency; and in the second display mode, the route is displayed to have a second transparency more transparent than the first transparency.

According the above map display apparatus, the route line can be displayed in the multiple display modes including the first display mode and the second display mode. In the first display mode, since the route line has a relatively low transparency, a difference between the map and the route line is clear, and a user can recognize the route by distinguishing the route line from the map on the display screen. In the second display mode, since the route line has a relatively large transparency, a user can visually recognize, through the route line, the information displayed underneath the route line. For example, text information such as name-places and the like can be visually perceivable through the route line.

As seen from the above, since the above map display apparatus enables a user to see the display screen in the multiple display modes, a user can easily perceive a lot of information displayed on the display screen.

According to a third example, a map display apparatus includes: a position information acquisition section configured to acquire present position information indicating a present position; a route determination section configured to determine a route from the present position, which is indicated in the present position information acquired by the position information acquisition section, to a destination designated via an input from an external of the map display apparatus; and a display section configured to display a map on a display screen based on map information acquired from a storage medium storing the map information, and configured to display the route, which is determined by the route determination section, in a form of a line on the map. The display section is further configured to display the route on the map while switching a manner of displaying the route in turn between multiple display modes including a first display mode and a second display mode, such that: in the first display mode, the route is displayed to have a first width; and in the second display mode, the route is displayed to have a second width larger than the first width.

According the above map display apparatus, the route line can be displayed in the multiple display modes including the first display mode and the second display mode. In the first display mode, since the route line has a relatively small width, a part on the map covered by the route line becomes small on the display screen, and thus, visibility reduction of information on the map by the route line can be suppressed. In the second display mode, since the route line has a relatively large width, a user can recognize the route by easily distinguishing the route line from the map on the display screen.

Therefore, since the above map display apparatus enables a user to visually recognize the display screen in the multiple display modes, a user can easily perceive a lot of information displayed on the display screen.

In the above map display apparatuses, the multiple display modes may include only the first display mode and the second display mode only. Alternatively, the multiple display modes may further include at least one intermediate display mode, which is intermediate between the first display mode and the second display mode. When switching the manner of displaying the route between the first display mode and the second display mode, the display section may display the route further in the intermediate display mode to make a gradual change in appearance of the displayed route.

According to this configuration, the route can be displayed in the intermediate display mode in the switching between the first display mode and the second display mode. Thus, a change in display manner of the route line becomes smooth. Therefore, it is possible to reduce an amount of effort that a user expends to visually recognize the route line.

The intermediate display mode has an intermediate characteristic between the first display mode and the second display mode. For example, the transparency or width of the route line is intermediate between that in the first display mode and that in the second display mode. The number of intermediate display modes is not limited to a specific number. As the number of intermediate display modes is larger, it appears that the change in display manner is smoother.

Speed of switching between the multiple display modes may not limited to a specific speed. However, the speed of switching (also called "switching speed") may be set so that a user can easily see the route line in each of the first display mode and the second display mode. Further, the switching speed may be changed depending on situations of using the map display apparatus. Specific examples may be the followings.

The map display apparatus may be mountable to a vehicle and for use in the vehicle. In accordance with speed of the vehicle, the display section changes the switching speed of the display manner between the multiple display modes. According to this configuration, since the switching speed can be changed depending on the speed of the vehicle, it is possible to reduce an amount of user visual recognition effort or providing other information to a user.

For example, when the switching speed of the display manner is large, a user visual effort may easily increase. Thus, when the travel speed of the vehicle is large, or in other words, when a user needs to watch an outside of the vehicle with care, the switching speed may be decreased to reduce user visual effort.

In addition, when the switching speed is changed depending on the travel speed of the vehicle, a user can read out information about the speed of the vehicle from the display of the route line. For example, when the vehicle is traveling at speeds exceeding a speed limit, the switching speed may be increased to give a user a recognition of overspeed.

The above map display apparatuses may be configured such that the display section changes the speed of switching between the multiple display modes based on a distance along the route between the present position on the map and a predetermined guidance point along the route According to this figuration, when the present position approaches the guidance point (e.g., a branch point on the route, an entrance of an expressway etc.), the switching speed can be changed in order to, for example, reduce user visual effort or provide other information to a user.

For example, when the present position is close to the guidance point, a user (e.g., a driver) may need to watch an outside or a map. Thus, the switching speed may be decreased to accomplish and ensure both of visibility and safety without requiring a user to expending a lot of visual efforts.

Alternatively, when the present position approaches the guidance point, the switching speed may be increased to notify a user that the present position approaches the guidance point.

Alternatively, the above map display apparatuses may be configured such that the display section changes the speed of switching between the multiple display modes based on the present position on the map.

According to the above configuration, for example, the switching speed can be changed (e.g., decreased) in the vicinity of an express way or a busy intersection. Therefore, it is possible to accomplish and ensure both of visibility and safety without requiring a user to expend a lot of visual efforts.

According to a third example, a computer readable storage medium storing a program is provided. The program causes a computer to function as at least a part of the above-described map display apparatuses. For example, the program may cause a computer to perform the steps of: displaying a map on a display screen based on map information acquired from a storage medium storing the map information; displaying a route from a present position to a destination in a form of a line on the map; and switching a manner of displaying, the route in turn between a plurality of display modes including a first display mode and a second display mode, such that in the first display mode, the route is displayed to have a first characteristic; in the second display mode, the route is displayed to have a second characteristic; the first characteristic includes at least one of a first transparency and a first width; and the second characteristic includes at least one of a second transparency more transparent than the first transparency and a second width larger than the first width.

While the invention has been described above with reference to various embodiments thereof, it is to be understood that the invention is not limited to the above described embodiments and constructions. The invention is intended to cover various modifications and equivalent arrangements.

Further, each or any combination of procedures, processes, steps, or means explained in the above may be achieved as a software section or means (e.g., subroutine) and/or a hardware section or means (e.g., circuit or integrated circuit), including or not including a function of a related device; furthermore, the hardware section or means can be constructed inside of a microcomputer.

Furthermore, the software section or means or any combinations of multiple software sections or means may be included in a software program, which is contained in a computer-readable storage media or is installed in a computer via a communications network.

What is claimed is:

1. A map display apparatus comprising:
   a position information acquisition section configured to acquire present position information indicating a present position;
   a route determination section configured to determine a route from the present position, which is indicated in the present position information acquired by the position information acquisition section, to a destination designated via an input from an external of the map display apparatus; and
   a display section configured to display a map on a display screen based on map information acquired from a storage medium storing the map information, and configured to display the route, which is determined by the route determination section, in a form of a route line on the map,
   wherein
   the display section is further configured to display the route on the map while switching a manner of displaying the route between a plurality of display modes including a first display mode and a second display mode, such that:
   in the first display mode, the route line is displayed to have a first transparency and a first width; and
   in the second display mode, the route line is displayed to have a second transparency more transparent than the first transparency and a second width larger than the first width.

2. The map display apparatus according to claim 1, wherein:
   the plurality of display modes further includes at least one intermediate display mode, which is intermediate between the first display mode and the second display mode; and
   when switching the manner of displaying the route between the first display mode and the second display mode, the display section displays the route line further in the intermediate display mode to make a gradual change in appearance of the displayed route line.

3. The map display apparatus according to claim 1, wherein:
   the map display apparatus is mountable to a vehicle and for use in the vehicle;
   in accordance with speed of the vehicle, the display section changes speed of switching between the plurality of display modes.

4. The map display apparatus according to claim 1, wherein:
   based on a distance along the route between the present position on the map and a predetermined guidance point along the route, the display section changes speed of switching between the plurality of display modes.

5. The map display apparatus according to claim 1, wherein:
   based on the present position on the map, the display section changes speed of switching between the plurality of display modes.

6. A non-transitory computer readable storage medium storing a program that causes a computer to perform the steps of:
   displaying a map on a display screen based on map information acquired from a storage medium storing the map information;
   displaying a route from a present position to a destination in a form of a route line on the map; and
   switching a manner of displaying the route in turn between a plurality of display modes including a first display mode and a second display mode, such that
   in the first display mode, the route line is displayed to have a first characteristic;
   in the second display mode, the route line is displayed to have a second characteristic;
   the first characteristic includes a first transparency and a first width; and
   the second characteristic includes a second transparency more transparent than the first transparency and a second width larger than the first width.

7. The map display apparatus according to claim 1, wherein:
   while scale of the map on which the route line is displayed remains constant, the display section switches the manner of displaying the route in turn between the plurality of display modes including:
   the first display mode, in which the route line is displayed to have the first transparency and the first width; and
   the second display mode, in which the route line is displayed to have the second transparency more transparent than the first transparency and the second width larger than the first width.

8. The non-transitory computer readable storage medium according to claim 6, wherein:
   while scale of the map on which the route line is displayed remains constant, the manner of displaying the route is switched in turn between the plurality of display modes including
   the first display mode in which the route line is displayed to have the first transparency and the first width; and
   the second display mode in which the route line is displayed to have the second transparency more transparent than the first transparency and the second width larger than the first width.

* * * * *